(12) United States Patent
Coleman et al.

(10) Patent No.: US 12,321,359 B2
(45) Date of Patent: Jun. 3, 2025

(54) SYSTEM, METHOD, APPARATUS, AND COMPUTER PROGRAM PRODUCT FOR GEOGRAPHIC EVENT MONITORING, DETECTION, ASSESSMENT, AND ALERT NOTIFICATIONS

(71) Applicant: Disaster Technologies Inc., Alexandria, VA (US)

(72) Inventors: Roger Vincent Coleman, Plandome, NY (US); Chris Okerberg, Shutesbury, MA (US); Sean Michael Griffin, Alexandria, VA (US); Io Flament, Brooklyn, NY (US); Jessica Leigh Decker, Frankfort, IN (US); Nikko Mitrano Schaff, Groton, NY (US)

(73) Assignee: Disaster Technologies Inc., Alexandria, VA (US)

( * ) Notice: Subject to any disclaimer, the term of this patent is extended or adjusted under 35 U.S.C. 154(b) by 72 days.

(21) Appl. No.: 17/659,548

(22) Filed: Apr. 18, 2022

(65) Prior Publication Data

US 2023/0334061 A1  Oct. 19, 2023

(51) Int. Cl.
*G06F 16/00* (2019.01)
*G06F 16/25* (2019.01)
*G06F 16/29* (2019.01)

(52) U.S. Cl.
CPC ............ *G06F 16/254* (2019.01); *G06F 16/29* (2019.01)

(58) Field of Classification Search
CPC .............................. G06F 16/254; G06F 16/29
See application file for complete search history.

(56) References Cited

U.S. PATENT DOCUMENTS

| | | | |
|---|---|---|---|
| 5,628,050 A | 5/1997 | McGraw et al. |
| 6,169,476 B1 | 1/2001 | Flanagan |
| 7,006,000 B2 | 2/2006 | Tung et al. |
| 7,515,041 B2 | 4/2009 | Eisold et al. |
| 8,126,440 B2 | 2/2012 | Bose et al. |
| 9,107,135 B1 | 8/2015 | Kennedy |
| 9,368,017 B2 | 6/2016 | Hsu et al. |
| 9,373,247 B2 | 6/2016 | Li et al. |

(Continued)

FOREIGN PATENT DOCUMENTS

WO  WO-2016095749 A1 *  6/2016  ............. G06F 16/00

*Primary Examiner* — Dinku W Gebresenbet
(74) *Attorney, Agent, or Firm* — Downs Rachlin Martin PLLC (57) ABSTRACT

A system, method, apparatus, and computer program product that provides geographic event monitoring, detection, assessment, and alert notifications. The system utilizes an extract, transfer and load data pipeline (named ETheL); an asset risk calculator (ARC) data pipeline for evaluating proximity of an asset to a geographic event; a Disaster Intelligence Communication Environment (DICE) which acts as the front-end of the platform; a COMS node providing a near-real time event alert system and a postGIS database used for persistence of events, locations, and calculations). Geographical indexing of the geographical description of event data with a designated location of interest (LOI) determines a cell intersection inhabited by each of an event and the LOI. Notifications may be programmed for each cell intersection. Mapping displays may be generated for showing the cell intersections with the LOIs.

13 Claims, 4 Drawing Sheets

(56) References Cited

U.S. PATENT DOCUMENTS

| | | | |
|---|---|---|---|
| 9,460,603 B2 | 10/2016 | Hamano et al. | |
| 9,648,581 B1* | 5/2017 | Vaynblat | H04L 67/535 |
| 10,027,711 B2 | 7/2018 | Gill et al. | |
| 10,595,183 B2 | 3/2020 | MacGabann | |
| 10,884,154 B2 | 1/2021 | Li et al. | |
| 11,011,051 B1 | 5/2021 | Bingham et al. | |
| 11,096,032 B2 | 8/2021 | Raje et al. | |
| 2004/0203568 A1 | 10/2004 | Kirtland | |
| 2006/0047543 A1 | 3/2006 | Moses | |
| 2007/0033153 A1 | 2/2007 | Yamanaka et al. | |
| 2009/0309742 A1 | 12/2009 | Alexander et al. | |
| 2012/0280823 A1 | 11/2012 | Yang | |
| 2016/0314176 A1* | 10/2016 | Dhayapule | H04L 47/125 |
| 2016/0357768 A1* | 12/2016 | Strong | G06F 16/29 |
| 2019/0394251 A1* | 12/2019 | Mehta | H04L 65/612 |
| 2020/0013084 A1* | 1/2020 | Tola | G06Q 30/0251 |
| 2020/0050611 A1* | 2/2020 | Patton | G06F 16/254 |
| 2020/0097491 A1* | 3/2020 | Berthiaume | G06V 10/44 |
| 2021/0081559 A1* | 3/2021 | Gratton | H04W 4/02 |
| 2021/0149927 A1 | 5/2021 | Coorey et al. | |
| 2021/0282226 A1 | 9/2021 | Matuchniak et al. | |
| 2021/0306467 A1 | 9/2021 | Al-Motairy et al. | |

* cited by examiner

SYSTEM, METHOD, APPARATUS, AND COMPUTER PROGRAM PRODUCT FOR GEOGRAPHIC EVENT MONITORING, DETECTION, ASSESSMENT, AND ALERT NOTIFICATIONS

BACKGROUND OF THE INVENTION

The present invention relates to geographic events, and more particularly to systems, methods, apparatus for monitoring geographic events.

When geographic events that can cause harm to persons or property occur, they must be assessed and addressed in a timely manner. The means of tracking events is disparate.

There are no comprehensive mechanisms for reacting to geographic events that can be tracked via software. Current event tracking systems are rigid and do not provide an intuitive and expansive means to set up notifications to a wide variety of geographic events.

As can be seen, there is a need for improved systems, apparatus, methods, and computer program products to provide geographic event monitoring, detection, assessment and notifications in a timely manner.

SUMMARY OF THE INVENTION

In one aspect of the present invention, a computer system for geographic event monitoring is disclosed. The computer system includes one or more processors, one or more computer-readable memories and one or more computer-readable, tangible storage devices; and program instructions, stored on at least one of the one or more computer-readable, tangible storage devices for execution by at least one of the one or more processors via at least one of the one or more computer-readable memories, to perform operations. The operations include receiving a data source containing a geospatial description of an event data from a distributed network of participating extract, transform, and load (ETL) servers. A dataset is extracted from the data source into a common operating format representing one or more geographical features and one or more non-spatial attributes of each of the one or more geographical features. One or more locations of interest (LOI) are defined. Each LOI has a name and a geographic coordinate defining a location of the LOI. The geospatial description of the event data is geographically indexed with the geographic coordinate of the LOI to determine a cell intersection inhabited by each of the event data and the LOI.

In some embodiments, the operations also include geographically indexing the geospatial description of the event data with the geographic coordinate of the LOI, recursively, to determine a highest granularity cell inhabited by each of the event data and the LOI.

In some embodiments, the operations also include populating an LOI to feature database table with an intersection of a latest active event.

In some embodiments, the operations also include notifying a user of the cell intersection of the event data with the LOI.

In some embodiments, the operations also include generating a data source mapping table for the distributed network. The data source mapping table indicates which participating ETL servers in the distributed network contain a data source. The data source mapping has a one-to-one correspondence with a universal resource locator (URL) for the data source.

In some embodiments, the operations also include generating a data source to event type table to match the data source with an event type, the event type providing a reference to multiple categories for classification of the event data.

In some embodiments, the operations also include generating a hazard database table containing information about an existing weather hazard type, an associated alert type, and a color code for the existing weather hazard type. The weather hazard types found in the dataset are categorized.

In some embodiments, the operations also include persisting the data sources in the common format.

In other aspects of the invention, a computer program product for geographic event monitoring is disclosed. The computer program product includes a computer readable storage medium having program code embodied therewith. The program code is executable by at least one processor to perform receiving a data source containing a geospatial description of an event data from a distributed network of participating extract, transform, and load (ETL) servers. A dataset from the data source is extracted into a common operating format representing one or more geographical features and one or more non-spatial attributes of each of the one or more geographical features. One or more locations of interest (LOI) are defined. Each LOI having a name and a geographic coordinate defining a location of the LOI. The geospatial description of the event data is geographically indexed with the geographic coordinate of the LOI to determine a cell intersection inhabited by each of the event data and the LOI.

In some embodiments, the program code is executable for geographically indexing the geospatial description of the event data with the geographic coordinate of the LOI, recursively, to determine a highest granularity cell inhabited by each of the event data and the LOI.

In some embodiments, the program code is executable for populating an LOI to feature database table with an intersection of a latest active event.

In some embodiments, the program code is executable for notifying a user of the cell intersection of an event data with the LOI.

In some embodiments, the program code is executable for generating a data source mapping table for the distributed network. The data source mapping table indicates which participating ETL servers in the distributed network contain a data source. The data source mapping table provides a one-to-one correspondence with a universal resource locator (URL) for the data source.

In some embodiments, the program code is executable for generating a data source to event type table to match the data source with an event type. The event type provides a referEnce to multiple categories for classification of the event data.

In some embodiments, the program code is executable for generating a hazard database table containing information about an existing weather hazard type, an associated alert type, and a color code for the existing weather hazard type. The weather hazard types found in the dataset are categorized.

In some embodiments, the program code is executable for persisting the data sources in the common format.

In other aspects of the invention, a computer-implemented method for geographic event monitoring is disclosed. The computer implemented method includes receiving a data source containing a geospatial description of an event data from a distributed network of participating extract, transform, and load (ETL) servers. A dataset from the data source is extracted into a common operating format representing one or more geographical features and one or more non-spatial attributes of each of the one or more geographical features. One or more locations of interest (LOI) are defined, each LOI having a name and a geographic coordinate defining a location of the LOI. The geospatial description of the event data is geographically indexed with the geographic coordinate of the LOI to determine a cell intersection inhabited by each of the event data and the LOI.

In some embodiments, the method includes geographically indexing the geospatial description of the event data with the geographic coordinate of the LOI, recursively, to determine a highest granularity cell inhabited by each of the event data and the LOI.

In some embodiments, the method includes populating an LOI to feature database table with an intersection of a latest active event.

In some embodiments, the method includes notifying a user of the cell intersection of an event data with the LOI.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, embodiments of the present invention provide a system, method, apparatus, and computer program product that provides geographic event monitoring, detection, assessment, and alert notifications.

Figure 1:
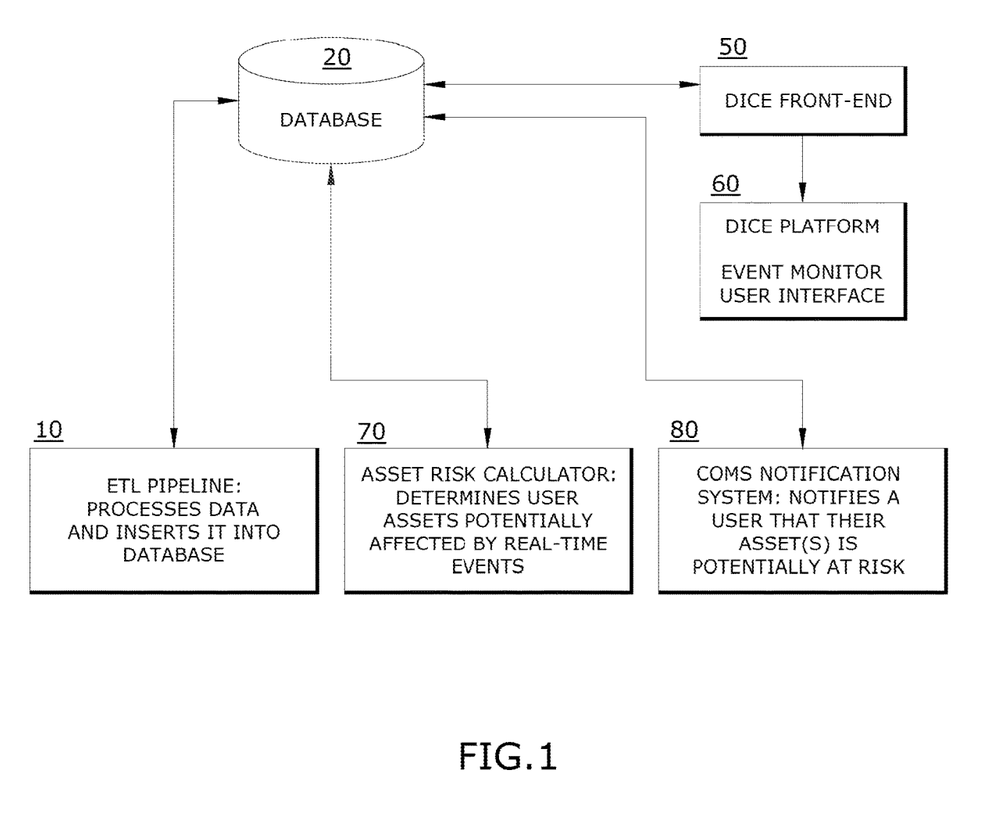
FIG. 1 is a representative system architecture for a geographic event monitoring system.

A system according to aspects of the invention is shown in reference to FIG. 1 and includes: an extract, transfer and load data pipeline (named ETheL) 10; an asset risk calculator (ARC) data pipeline 70 for evaluating proximity of an asset to a geographic event; a Disaster Intelligence Communication Environment (DICE) 50 which acts as the front-end of the platform 50; a COMS node 80 (node.js instance that acts as an API); a near-real time event alert system and a postGIS database 20 (used for persistence of events, locations, and calculations).

Figure 2:
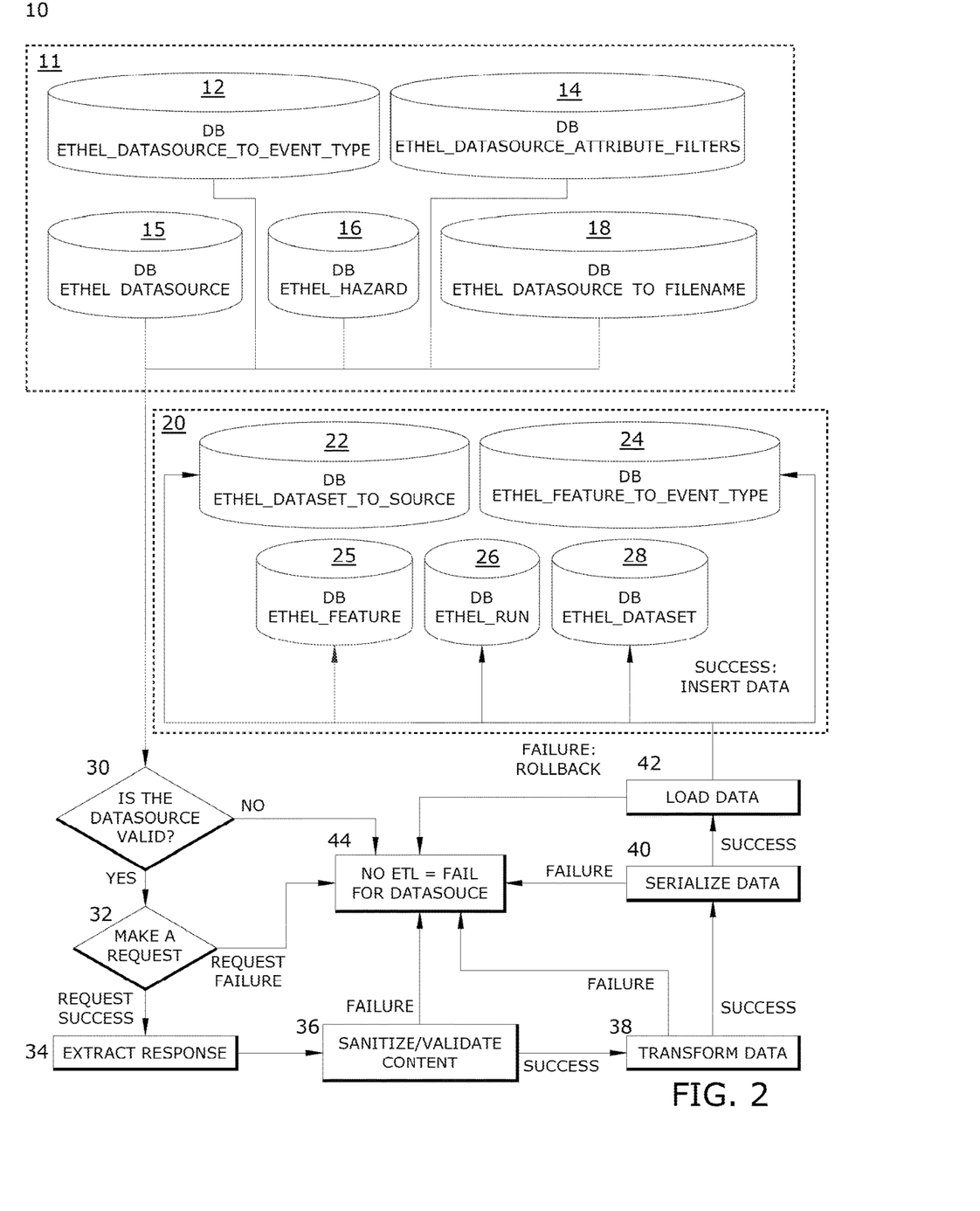
FIG. 2 is a representative system architecture and process flow for a data ETL pipeline.

The ETheL pipeline 10 process is shown in reference to FIG. 2. The ETheL pipeline 10 is configured as an open data extract, transform, and load (ETL) Pipeline, that is, a tool for retrieval, extraction, curation, and integration of open data from a distributed network of participating ETL servers into DICE 50. DICE 50 is the user-facing aspect of the platform 60, which may be written using a React JavaScript framework. The ETheL pipeline 10 repository is available at https://github.com/DisasterTechInc/ETheL.

The ETHeL pipeline structure 10 relies on multiple input database tables 11, including: an ETheL_Datasource_To_Event_Type database table 12; an ETheL_Datasource_Attribute_Filters database table 14; an ETheL_Datasource database table 15; and an Ethel_Hazard database table 16.

The ETheL_Datasource_To_Event_Type database table 12 is found within the postGIS database 20. The ETheL_Datasource_To_Event_Type database table 12 includes three columns which collectively serve to match a "data source" with an "event type". Each "data source" corresponds to a specific URL from which event data can be retrieved. The "event type" refers to one multiple categories for classification of event data. The ETheL_Datasource_To_Event_Type database table 12 is maintained by Disastertech developers.

The ETheL_Datasource_Attribute_Filters database table 14 is found within the Disastertech postGIS database. The ETheL_Datasource_Attribute_Filters database table 14 includes columns tracking an attribute name, a required attribute value, the name of a removed attribute, and a true/false value determining if a value matching strategy is required. The ETheL_Datasource_Attribute_Filters database table 14 informs ETheL whether any attributes are required to proceed with the ETL for a given data source, and which attributes are required when determining which data sources need to be removed. This information is helpful in providing a clear user experience, as we do not want to be displaying irrelevant information to our users. A use case example of this would be power outage data: if the datasets contain geometries for each county, but no power outage information, or an absence of an outage, there is no need to be displaying this data to a user.

The ETheL_Datasource database table 15 resides in the Disastertech postGIS database. It consists of columns tracking the URL of the data to be fetched, attribution, a description, a valid time window, a location coverage, an update frequency, a true/false value determining if the data should be imported into Azure, and an event name to be attributed to the data.

The ETheL_Hazard database table 16 resides in the Disastertech postGIS database. This table contains information about existing weather hazard types, the type of associated alert, and the official color code for this hazard type. Ethel uses information from this table to categorize the hazard types found in datasets during ETL.

The ETheL pipeline 10 performs Data Retrieval and Extraction; Data validation; Data Transformations and Curation; Data Serialization and Loading into a DB. ETheL pipeline 10 optimizes preparation and storage of geospatial data, for better performance and improved retrieval/usage of data by the platform.

Data Retrieval 32 and Extraction 34

At block 30, a URL for a source database 11 is checked for validity. The data source's URL is validated and checked against standard a URL structure. If the URL for the input database 11 is valid, the data source is retrieved from the host through an HTTP request, as depicted at block 32. Data payloads include (but are not limited to) geospatial descriptions of event data. The data-payload residing behind a given URL is typically presented in geoJSON format and defines geographically distinct features with common properties.

Presuming that the URL passes the afore-mentioned tests, fetch requests are made to the input source database located at the URL. (website or storage account). The event data is then fetched from the input database 11. Once the event data has been fetched, at block 34 the event data is extracted from the response.

The extraction process involves re-formatting the payload into a common operating format for the ETHeL platform so that it can be intelligible and operated on by the rest of the platform. Preferably the common operating format is the geoJSON format, an open standard format designed for representing simple geographical features, along with their non-spatial attributes. The geoJSON format is based on the JSON format. The features include points, line strings, polygons, and multi-part collections of these types an open standard format designed for representing simple geographical features, along with their non-spatial attributes. It is based on the JSON format. The features include points, line strings, polygons, and multi-part collections of these types. The geoJSON format specification was published by the Internet Engineering Task Force (IETF) as RFC 7946, August 2016 and is available through https://geojson.org.

For example, multi-feature data structures are split into separate objects. This is done to allow the geospatial definitions to be acted upon in a manner that is more precise than would otherwise be achievable. In the event that the data source is not in a typical format (such as an ESRI shapefile or geoJSON), the extraction process allows for custom scripts to bring a non-conformant data source into a similar structure as other data sources being tracked by the system. For example, if a CSV document defining latitude and longitude coordinates of events is a data source, this organization of the data source can be reformatted so that the platform can take a unified approach to processing all data sources.

Data Sanitization/Validation 36

At block 36, the data content is sanitized and then validated. In a sanitizing process, geospatial data is re-structured from an ESRI shapefile into a geoJSON format, as per the notes above. In the validation step, data is checked against known structures. In some cases, this structure is suggested via common standards such as geoJSON.

The sanitizing and validation processes check the accuracy, quality, and authenticity of data. When the data sources are persisted in a common format, then the data sources can be reliably used in the context of business logic and comparison for triggered states and so forth. This reliability translates directly into the veracity of the process and limits the opportunity for regressions and instability to be introduced. Efforts to address deviations can be focused upon the sanitization and validation of each data source individually. This practice effectively enacts a quarantine around any aberrant observed behavior.

Data Transformations and Curation 38

In the transformation and curation process 38, the data is loaded for data preprocessing. This is where any preprocessing and curation of the data occurs. Each transformation has a specific, unique, small, and scoped purpose, enhancing testability and ease of maintenance. One such example of necessary transformation is the afore-mentioned need to break multi-feature objects into separate objects. This step is undertaken to increase the precision of later geospatial comparisons. As discussed above, the maintenance of the over-all platform is enhanced if there is a separation of concerns. Errors in the code that enforce a common data structure can then be corrected independent of the code which conducts comparisons of geospatial information, for example.

Data Serialization 40 and Loading 42 into the Output DB 20

Once data has been processed, and has passed checks, data is prepared for import into the output database 20.

A failure at each of processes 30, 32, 34, 36, 38, 40, 42 is captured as an export, transfer, load at 44. In the event of a failure the data may be reprocessed or flagged for a manual processing and/or troubleshooting as to the cause of the failure.

The ETHeL pipeline 10 optimizes preparation and storage of geospatial data, for better performance and improved retrieval/usage of data by the platform.

The ETHeL pipeline 10 makes use of a PostGIS database 20. In particular, the ETheL_Datasource_To_Event_Type database table 12; the ETheL_Datasource_Attribute_Filters database table 14; the ETheL_Datasource database table 15; and the ETheL_Hazard database table 16. The system separates data from metadata in storage during the transform data step 38. The system preprocess event data to remove null data.

A database output 20 for the ETHeL pipeline structure 10 includes a plurality of database tables, including: an ethel_dataset_to_datasource database table 22; an ethel_feature_to_event_type database table 24; an ethel_feature database table 25; an ethel_dataset database table 26; and an ethel_run database table 28.

The ethel_dataset_to_datasource database table 22 is located within the Disastertech postGIS database. The ethel_dataset_to_datasource database table 22 includes columns which track associations of a dataset to a data source. The ethel_dataset_to_datasource database table 22 represents these associations in a "one to many" manner, as there is the potential for multiple datasets to exist within the context of a single data source. Data sources map 1:1 with a URL. Datasets are objects extracted from a data source, and include geospatial or textual data, containing one or several features.

The ethel_feature_to_event_type database table 24 records associations between individual features and the one or more event types. Individual features are defined through the processing of data source datasets and describe specific geographic areas and their properties. Examples of features include the definition of areas affected by events such as snow accumulation, ice accumulation, areas experiencing high winds, etc. Each of these individual events are categorized according to larger event types for ease of use. For example, there may be a "Winter weather" event type which encompasses more granular events such as snow accumulation, ice accumulation, and areas experiencing high winds.

The ethel_feature database table 25 contains the data ETLed. A single row contains a single feature. For geospatial data, a feature consists of one or more properties and a geometry. For textual data that does not provide geospatial information, the geometry field will be empty and only text will be available in the properties field. The other fields available in this table can be leveraged in our platform, providing valuable information for decision making. If information is available for these fields, they are populated. If not, they are left empty.

The ethel_dataset database table 26 contains the ID of each dataset that has been processed, along with the raw data (unprocessed version of the ETLed data). This raw data is not intended for use in the platform but is kept as a backup or for further processing.

The ethel_run database table 28 contains information of all the runs of Ethel. Each run consists of a row in the table. Each row tracks which data source was retrieved, the resulting dataset ID that was created, and the timestamp at which the ETL was conducted.

An incident_assets database table is provided for recording the locations of interest. A location of interest is an area on a map that a user defines and names. The area can take any shape, whose boundaries are defined by latitude and longitude coordinates. The incident_assets table records columns for the name, the location (represented as a geoJSON object), and any notes that the user chooses to record for that location. The notes are captured as free-form text.

The locations of interest entries are compared with a list of geographic events. The geographic events are catalogued as a result of the ETL process defined by ETHeL, as noted earlier in this document. The geographic events are time-based, and use the ETL data sources tracked by the platform as the source of their definition. The events cover many different categories (otherwise referred to as "event types"), and are sourced from many different third-party suppliers of data. These third-party suppliers of data are defined as data sources on the platform. For example, the National Weather Service may publish a dataset that defines areas affected by high winds. This data can be categorized within the "Winter Weather" event type on the platform.

The events take the form of map-able areas that are affected by the event. The data sources (which have been recorded in the afore-motioned input data source tables) of the event are regularly polled (every 5 minutes) to provide a regular update to the system. Locations of interest are considered triggered by a comparison of their geometry to that of the selected events. When there is an over-lap of the location of interest geometry and the geometry of the event, the location is considered to be in a triggered state.

The system is a vast improvement over existing solutions due to its configurability and responsiveness. It is highly configurable in that it affords the user precise control over the areas that are under observation. It also provides an intuitive mechanism to "pre-bake" the messages being sent to users such that they can establish standard operating procedures prior to the occurrence of an event. The responsiveness of the system is bolstered by the use of geographical indexing prior to calculation of location triggering.

Geographical indexing is a process by which granular geometries are categorized according to a series of grids that have ever-coarser granularity. For example, a single cell of the grid could be the size of a state. Thus, if both location of interest and event inhabit the same cell, then additional comparison can be made to refine the granularity of that comparison. A next level of geographical indexing consists of cells that are the size of a county. Comparisons would be then made at that level to see if the location of interest and event geometries both inhabit similar county-sized cells, and the process would continue until the level of geographical indexing with the highest level of granularity is compared for both location of interest and event. The advantage of this approach is that due to the innate complexity of the shapes of the event data and the shapes of the locations of interest, direct comparison of geometries becomes a time and resource consuming process. Geographical indexing also provides a mechanism that is highly scalable, and provides an avenue for success when comparing a large number of events and locations of interest.

The existing mechanisms in this field do not perform calculations very efficiently. Due to the rationale provided above, existing mechanisms in this field that conduct direct comparisons of geometries are vulnerable to problems encountered at a large scale, and when fast turn-around of calculation time is paramount. Preferably, the system can maintain updates on a cadence of 5 minutes.

Asset Risk Calculator 70

The Asset Risk Calculator (ARC) 70 determines user assets potentially affected by real-time events. An implementation of the ARC 70 is shown in reference to FIG. 3. The role of ARC 70 is to check event data 72 against active user LOIs 74, and to populate a database table called loi_to_feature 76 with knowledge of which LOIs 74 intersect with the latest active events 72.

Figure 3:
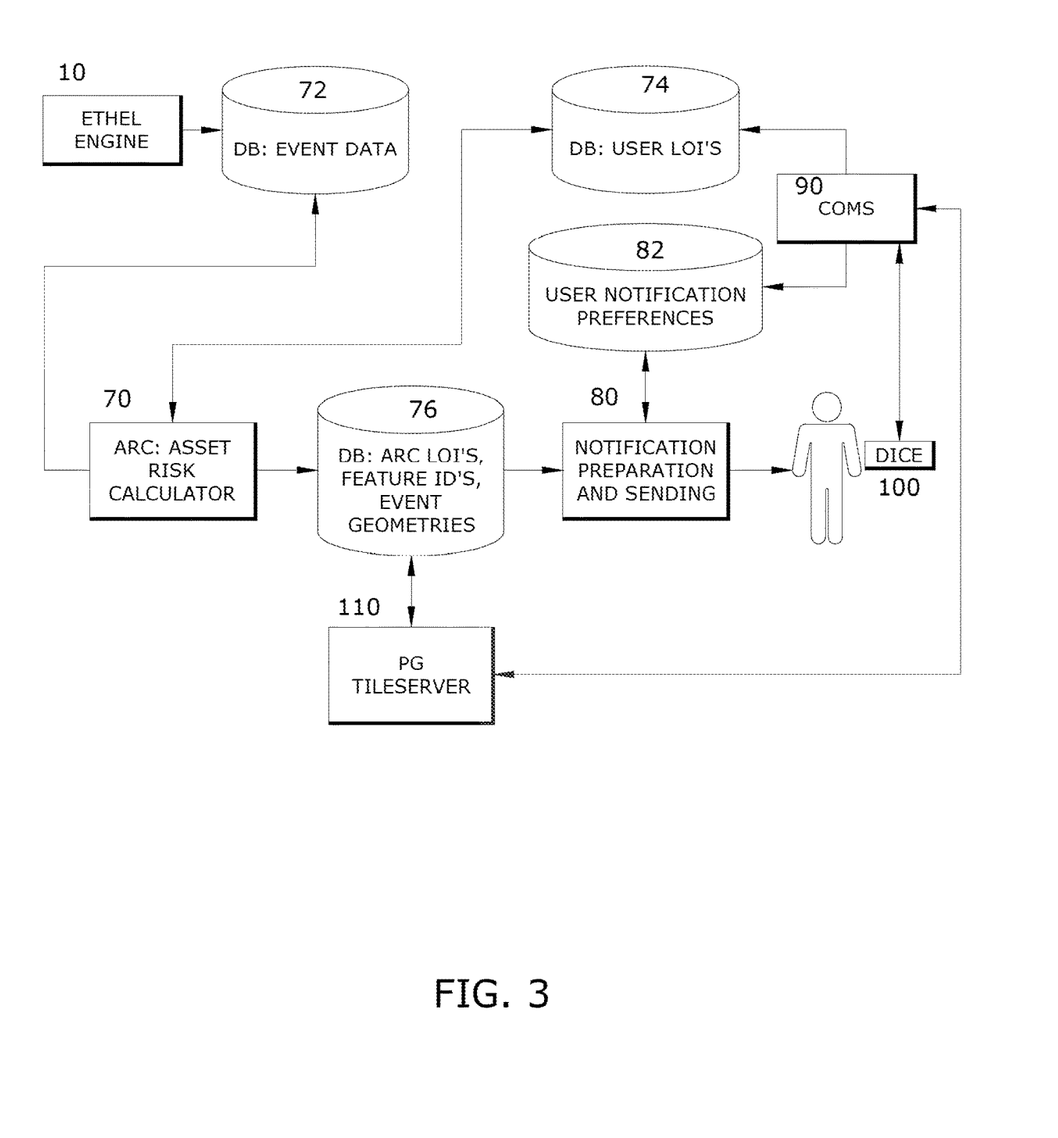
FIG. 3 illustrates operation of a near-real time alert system for the geographic event monitoring system.

A component of the ARC pipeline is an event alert system. The event alert functionality notifies the user when the user's LOIs 74 intersect with the active events 72. The user can subscribe to alerts for a given LOI and set preferences for the alert reception modality. The event alert database loi_to_feature holds the knowledge of which alerts have previously been sent to which user, for which LOI.

A COMS (which may be a node.js instance) 90 handles notifications according to the user notification preferences 82, "Location of Interest" (LOI) 74 intersection checks with incoming events, and the display of the "triggered" locations/events on a user DICE display 100. Where this implementation creates performance issues, certain calculations and tasks can be moved to a back end, in an ARC pipeline 120 to reduce the workload on COMS 90.

The COMS is a node.js instance that provides a centralized mechanism to define how the front-end of the platform accesses the database tables. Endpoints are provided in a RESTful manner that allow the front end to make queries of the database to either persist or retrieve information.

A PT Tileserver is provided as a mechanism of packaging the geospatial information for later display on a map. The PT Tileserver is included in the platform to improve scalability. For example, the PT Tileserver allows the platform to restrict the information being sent to the DICE front-end to only include that data which would show up within a viewport of the map, thus reducing the need for sending data that would not be displayed. The PT Tileserver also allows the data to be made ready for map display. If the data was being sent using a format such as geoJSON, that format would need to be transferred on the DICE front-end client into the proper format demanded by the map. Placing such transformation within the PT Tileserver allows for the calculations inherent in the transformation to occur on a much faster CPU with the potential to be configured to run in a multi-core orientation that would support simultaneous parallel processing. The operation of Tile servers and their properties will be understood by one of skill in the art.

Asset Risk Calculator Pipeline 120

Figure 4:
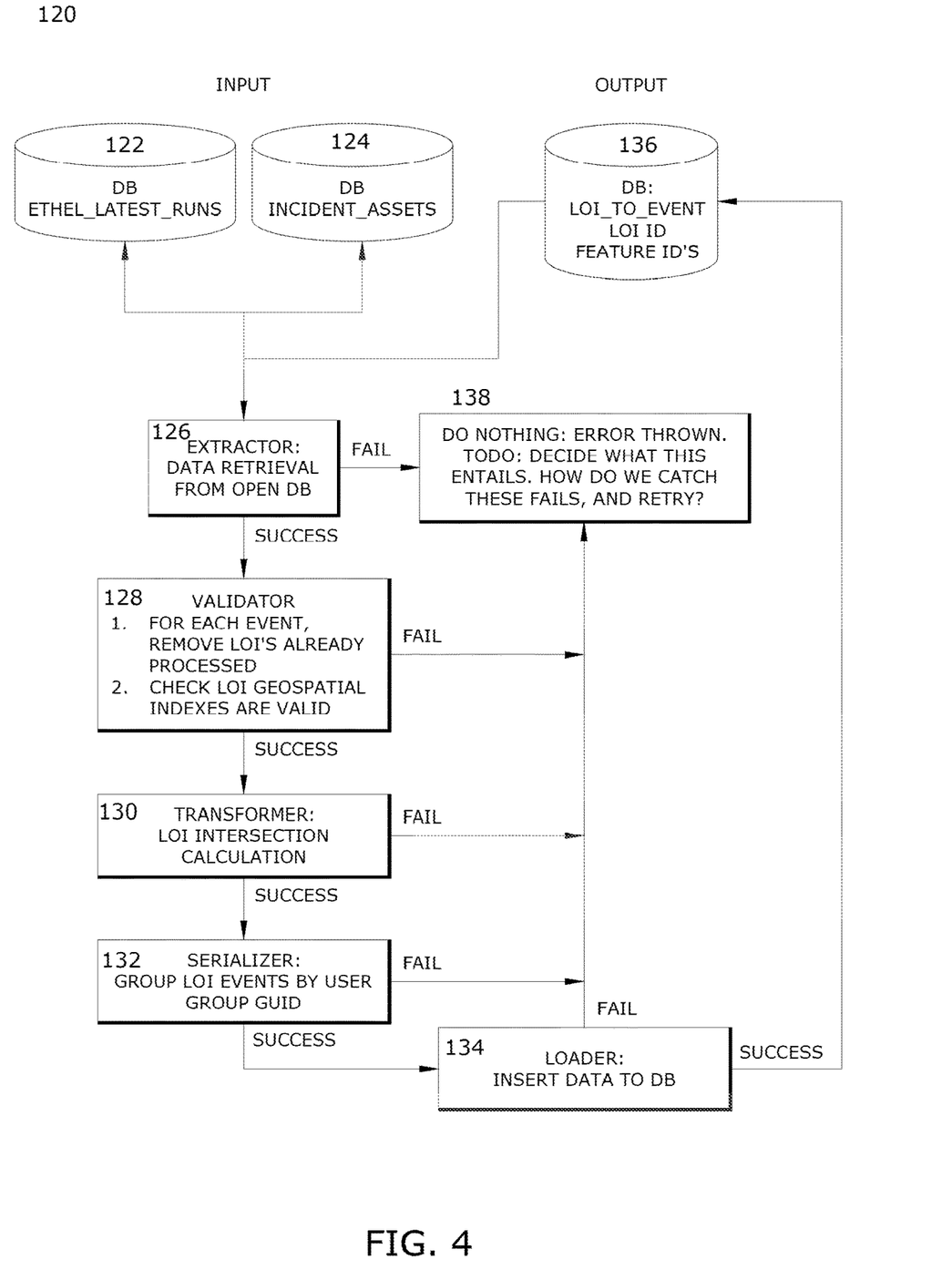
FIG. 4 illustrates a ETheL data pipeline process for the geographic event monitoring system.

The ARC pipeline 120 is shown in reference to FIG. 4. The ARC pipeline 120 receives inputs from an ETheL_latest_runs database table 122 and an incident_assets database table 124. The ETheL_latest_runs database table 122 consists of columns tracking each data source retrieval from the defined data sources. The incident_assets database table 124 contains data that defines the locations of interest.

The ARC pipeline 120 is matches locations of interest, or assets, with intersecting events deemed to be of interest by the asset's group members. Like the ETHeL pipeline 10, the ARC pipeline 120 is broken up into distinct steps, each with a specified purpose.

In a first step an extractor 126 retrieves data from the EtheL_Latest_Runs database 122 and the Incident_Assets database 124. The extractor 136 is responsible for retrieving all LOIs, all event features from the latest ETheL run 122, and the results of the previous ARC run from Incident_Assets database 124.

A transformer 130 performs the bulk of the ARC pipeline 120 workload. For each LOI, the H3 Hexagonal hierarchical geospatial indexing system indexes will be compared against indexes of all event features whose event type is of interest to the owning group. LOIs with no intersecting events will be filtered out during this step.

A serializer 132 groups all LOIs by a group GUID in preparation for notifying groups of imminent events affecting their LOIs. The "group" is analogous to the organization that the LOIs (and affected users) pertain to. In this case the GUID is simply a unique identification number that helps to differentiate between groups. When a group is created on the platform, the GUID is generated and associated with all the data objects that are relevant to that group.

A loader 134 is configured to handle the bulk import of the new LOI-event intersections into the ARC output database table arc_loi_event. The arc_loi_event database table 136 associates a specific LOI to the associated event.

If memory constraints or a sheer number of records to process causes the ARC pipeline 120 to exceed runtime constraints, a similar pipeline may be implemented using a distributed data processing framework may present a feasible alternative.

There are several features that allow the system to work together. The primary mechanism that allows for the ARC framework 120 to detect changes to the postGIS database is the employment of the one or more trigger functions. In this way, the database itself acts as the central hub of control for initiating the behavior of the ARC system 120. This also allows for a platform/language agnostic approach. Each of the individual parts of the system can be written in a different language and utilize the libraries and hardware that is most suited to the task at hand.

The second feature of the system is the use of the postGIS intersection calculation that can take place directly within the database query itself, thus limiting excessive transfer of data out of the database and ensuring a multi-threaded postGIS environment can perform calculations in a parallel fashion. In addition, modules that leverage H3 for geospatial indexing are also employed, thus providing a pre-calculation filter to enhance performance and reduce overall hardware usage.

DICE (Front-End of the Platform)

The system utilizes a front-end web application, a back-end API server written on node, several algorithms written in python, and the employment of an instance of postGIS that has been properly configured to handle H3 processing, a hexagonal hierarchical geospatial indexing system.

Use of the System

The user first navigates to the "Event Monitor" screen on the DICE platform. They then select one or more of the event types that they wish to observe. By way of non-limiting example, the selection may be by activating certain checkbox controls. The user may also create and/or select a notification. A notification must have a recipient, a subject, and a body in order to be successful. Next, the user will identify one or more location(s) of interest (LOI).

The user may identify the one or more location(s) of interest in one of three ways. First, the user may specify an address and a corresponding radius of effect. second, the user may select a building at a specific address. The user may draw a geofence to create a shape for the location of interest. The system will then send automatic notifications when location(s) of interest are triggered by the specified event.

Also, aspects of the present invention can provide decision support products With further analysis of the vulnerability and exposure (cost) of the location the user can understand a coherent risk profile of the assets under observation. The event properties can be analyzed as well, such that the specific vulnerabilities of the locations can be evaluated according to the detailed nature of the event under observation. Thus, only those locations under a maximum of risk will be elevated in the awareness of the user.

The system of the present invention may include at least one computer with a user interface. The computer may include any computer including, but not limited to, a desktop, laptop, and smart device, such as, a tablet and smart phone. The computer includes a program product including a machine-readable program code for causing, when executed, the computer to perform steps. The program product may include software which may either be loaded onto the computer or accessed by the computer. The loaded software may include an application on a smart device. The software may be accessed by the computer using a web browser. The computer may access the software via the web browser using the internet, extranet, intranet, host server, internet cloud and the like.

The ordered combination of various ad hoc and automated tasks in the presently disclosed platform necessarily achieve technological improvements through the specific processes described more in detail below. In addition, the unconventional and unique aspects of these specific automation processes represent a sharp contrast to merely providing a well-known or routine environment for performing a manual or mental task.

The computer-based data processing system and method described above is for purposes of example only, and may be implemented in any type of computer system or programming or processing environment, or in a computer program, alone or in conjunction with hardware. The present invention may also be implemented in software stored on a non-transitory computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications may be made without departing from the spirit and scope of the invention as set forth in the following claims.

What is claimed is:

1. A computer system, comprising: one or more processors, one or more computer-readable memories and one or more computer-readable, tangible storage devices; and program instructions, stored on at least one of the one or more computer-readable, tangible storage devices for execution by at least one of the one or more processors via at least one of the one or more computer-readable memories, to perform operations comprising:
receiving a data source containing a geospatial description of an event data from a distributed network of participating extract, transform, and load (ETL) servers, wherein the data source has a universal resource locator (URL);
validating the data source by checking the URL against a standard URL structure;
after the data source is validated, extracting a dataset from the data source into a common operating format representing one or more geographical features and one or more non-spatial attributes of each of the one or more geographical features;
defining an event based on the dataset, the event including an event geometry based on the one or more geographical features and an event type based on categories for classification of the one or more non-spatial attributes;
defining one or more locations of interest (LOI), each LOI having a name, a selected event type, and a geographic coordinate defining a location geometry of the LOI, wherein the location of the LOI is defined by an active user and the name is supplied by the active user; and
comparing, only when the event type matches the selected event type, the event geometry to the location geometry of the LOI to determine whether the event geometry and the location geometry of the LOI overlap.

2. The computer system of claim 1, further comprising: providing an alert to the active user when the event geometry and the location geometry of the LOI overlap.

3. The computer system of claim 1, further comprising: repeating the comparing at least every five minutes.

4. The computer system of claim 1, further comprising: generating a data source mapping table for the distributed network, wherein the data source mapping table indicates which participating ETL servers in the distributed network contain a data source, the data source mapping in a one-to-one correspondence with a universal resource locator (URL) for the data source.

5. The computer system of claim 4, wherein defining the event includes generating a data source to event type table to match the data source with an event type, the event type providing a reference to multiple categories for classification of the event data.

6. The computer system of claim 1, further comprising: generating a hazard database table containing information about an existing weather hazard type, an associated alert type, and a color code for the existing weather hazard type;
categorizing the weather hazard types found in the dataset; and
associating one or more of the weather hazard types with the event type.

7. The computer system of claim 1, further comprising: persisting the data sources in the common format.

8. A computer program product, comprising a non-transitory computer readable storage medium having program code embodied therewith, the program code executable by at least one processor to perform:
receiving a data source containing a geospatial description of an event data from a distributed network of participating extract, transform, and load (ETL) servers wherein the data source has a universal resource locator (URL);
validating the data source by checking the URL against a standard URL structure;
after the data source is validated, extracting a dataset from the data source into a common operating format representing one or more geographical features and one or more non-spatial attributes of each of the one or more geographical features;
generating a data source to event type table to match the data source with an event type, the event type providing a reference to multiple categories for classification of the event data;
defining one or more locations of interest (LOI), each LOI having a name and a geographic coordinate defining a location of the LOI, wherein the location of the LOI is defined by an active user and the name is supplied by the active user, and wherein the LOI includes an event type of interest;
geographically indexing the geospatial description of the event data with the geographic coordinate of the LOI to determine a cell intersection inhabited by each of the event data and the LOI;
comparing the event type matched to the data source with the event type of interest of the LOI; and
notifying the active user when the cell intersection is inhabited by the event data and the LOI and the event type matched to the data source is the event type of interest of the LOI.

9. The computer program product of claim 8, the operations further comprising:
geographically indexing the geospatial description of the event data with the geographic coordinate of the LOI recursively to determine a highest granularity cell inhabited by each of the event data and the LOI.

10. The computer program product of claim 8, further comprising:
populating an LOI to feature database table with an intersection of a latest active event.

11. The computer program product of claim 8, further comprising:
generating a data source mapping table for the distributed network, wherein the data source mapping table indicates which participating ETL servers in the distributed network contain a data source, the data source mapping in a one-to-one correspondence with a universal resource locator (URL) for the data source.

12. The computer program product of claim 8, further comprising:
generating a hazard database table containing information about an existing weather hazard type, an associated alert type, and a color code for the existing weather hazard type; and
categorizing the weather hazard types found in the dataset.

13. The computer program product of claim 8, further comprising:
persisting the data sources in the common format.

* * * * *